Inventor
Paul Eisler

March 8, 1966  P. EISLER  3,239,642
ELECTRICAL TRANSFORMERS
Filed May 3, 1963  9 Sheets-Sheet 3

Inventor
Paul Eisler

Inventor
Paul Eisler

March 8, 1966 P. EISLER 3,239,642
ELECTRICAL TRANSFORMERS
Filed May 3, 1963 9 Sheets-Sheet 8

Inventor
Paul Eisler

March 8, 1966    P. EISLER    3,239,642
ELECTRICAL TRANSFORMERS

Filed May 3, 1963    9 Sheets-Sheet 9

Inventor
Paul Eisler

United States Patent Office 3,239,642
Patented Mar. 8, 1966

3,239,642
ELECTRICAL TRANSFORMERS
Paul Eisler, 57 Exeter Road, London NW. 2, England
Filed May 3, 1963, Ser. No. 277,927
Claims priority, application Great Britain, Aug. 6, 1957, 24,703/57; Sept. 6, 1962, 34,258/62; Oct. 18, 1962, 39,431/62
9 Claims. (Cl. 219—10.47)

This application is a continuation-in-part of my application Serial No. 752,384, filed July 31, 1958, now Patent No. 3,089,017.

The present invention relates to electric step down transformers and to electrical heating whether for space heating or for heating objects or materials such as water or foodstuffs.

In the ordinary way the function of a transformer is to change the voltage of an alternating current with as little loss as possible compatible with reasonable cost and sound construction. For this reason, transformers are usually made of relatively costly material such as special silicon steel for the core which has low eddy current hysteresis loss, and the losses in the windings are kept low by limiting the current density and using high conductivity material.

The losses in a transformer go up with reduction in the quantity and quality of material in the core; they also go up if the cross section of the conductors is reduced. The losses moreover appear as heat. If now the whole purpose of the transformer is to form part of a heating system, provided the heat can be applied where wanted and the temperatures involved are suited to the purpose it is no disadvantage if part of the useful heat is developed as loss in the transformer, and in certain directions at any rate this can reduce the cost of the heating system as well as the cost of the transformer by reducing the quantity of material used as well as by making it possible to use material of cheaper quality as is in fact done in the present invention.

The purpose of using a transformer at all is to enable the heating (apart from the heat produced in the transformer itself) to be effected in a low voltage circuit supplied from the secondary winding of the transformer the voltage in which is below a value which is considered dangerous to touch. Accordingly the secondary voltage is made less than, and usually considerably less than say 48 volts between conductors and between conductors and earth. The secondary winding will be completely insulated and separated from the mains. In view of the purpose of the transformer the primary winding is made suitable for connection to conventional mains in which the supply may be at 100–600 volts more usually 110 or 220/250 or 440 volts at 50 cycles.

Briefly stated the present invention provides an electrical heating system which includes a combined electrical step down transformer and heat dissipator, an electrical resistance heating element separate from the combined transformer and dissipator, but supplied from the secondary winding thereof and converting substantially the whole electric output of the combined transformer and dissipator into heat, the coils of said combined transformer and dissipator being proportioned so that when under normal load they convert a substantial though minor fraction (in the order of 10 to 33 percent) of the electrical input into heat which the dissipator transmits directly into the same space in which the separate heating element operates without the necessity of additional dissipation devices and without any point within the transformer rising to a dangerous temperature.

By the term dangerous temperature is meant a temperature at which any part particularly the insulation of the transformer would suffer damage or the maximum temperature allowed by codes issued by competent authorities. The relationship between surface temperature of a transformer and the temperature developed within its structure is a subject on which ample data is available to those skilled in the art while the relationship between surface temperature of the transformer and that of the surface of the dissipator is also a matter susceptible of calculation from the dimension and material of the dissipator in the light if necessary of simple tests in any particular case, thus enabling the maximum permissible load on the transformer to be evaluated.

It is not only in heating systems where a lower efficiency of a transformer can be tolerated. Where conditions allow a temperature rise in still air of 60 to 70° C. (or more) above ambient instead of the more usual figures of 40 to 50° C. which in turn means that at least one of the windings of the transformer has a total heat dissipating surface area of less than one square inch per watt lost in said winding when continuously carrying its full load current, constructions of transformer provided by the invention enable the transformers to be supplied for such operating conditions which have substantial advantages in their construction and methods of production. A transformer according to the invention has the said winding made as a single layer coil of a conductor forming a helicoid of axially thin and radially wide cross section with its inner edge facing the core and having on its outer edge at most a thin layer of thermal barrier material constituting electrical insulation. Such a construction imposes no impediment to the direct outward flow in the cross section of the conductor of the heat developed and little or no impediment to its outflow at the outer edges of the winding which constitute the heat dissipating surface of the winding and thus even though the latter may be less than one square inch per watt lost in the winding the temperature at the inner-most points will not rise to an excessive value.

Further details of the construction of the transformer and especially of the insulation of the turns of the windings and the removal of heat will be given below.

As well as serving in a heating system as a space heating radiator within a space essentially heated by the low voltage resistance heating device connected across its secondary terminals, a transformer according to the present invention is very suitable for use as a hot plate or warmplate in connection with the heating up of food and keeping food hot or warm once it has been heated by the secondary current applied.

Because a transformer used according to the present invention develops considerable heat within itself but in association with a heat dissipator has a high surface to volume ratio, it can be used to operate a heating cycle which gives very rapid production of heat at first with a more or less steep or gradual falling off. Such a cycle will conveniently directly heat foodstuffs and then maintain them hot. Furthermore it can produce a secondary voltage having a similar character, which is useful for any more intensive initial heating-up purpose.

The invention will be further described with reference to the accompanying diagrammatic drawings which illustrate some embodiments of the transformer and possible modifications thereof as well as one form of circuit in which it may be used. It will be understood that the drawings are given by way of example and that the invention is not confined by them.

Figure 1:
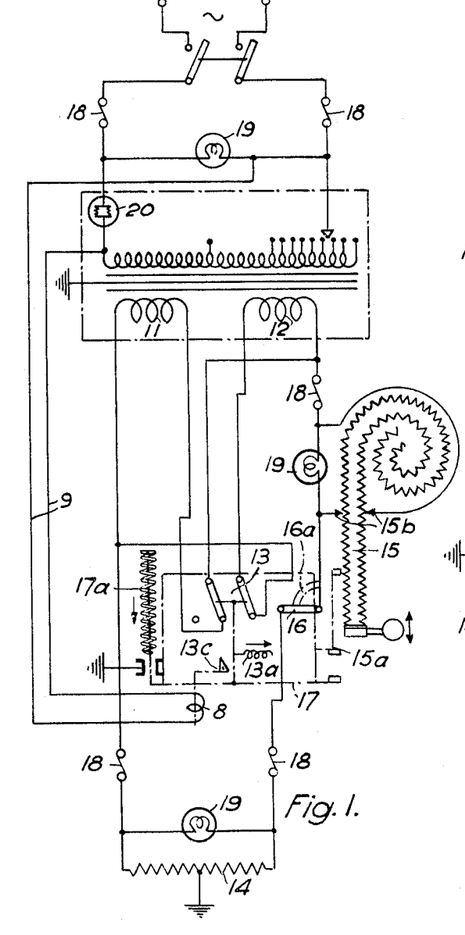
FIGURES 1 and 2 are circuit diagrams showing how a heating system according to the invention may be set up.

FIGURE 1 shows a typical heating system according to the invention embodying a transformer and a low voltage heating element supplied thereby. The primary coil is designed to be energised from a normal mains supply say at 240 volts 50 cycles. The secondary coil comprises two windings 11, 12 which can be put in series and parallel by a switch 13. The primary coil may have tappings for regulation purposes operated on the mains side in a conventional manner while the secondary side is controlled by a resistor 15 of tape form having two parallel branches which can be extended or which rolls up for instance under spring tension like a measuring tape. The lower ends of the two branches are connected together and only the extended length below the contacts 15b is connected by the latter in the circuit either in series with the main external load 14 or on the full secondary voltage and constituting itself a minor external load that is a heating tape used for instance as an alternative small heater instead of the large external heater 14.

The switch-over is effected by switch 16 which has three positions: In the centre position (shown in FIGURE 1) resistor 15 is in series with load 14 permitting a continuous variation of the ohmic resistance of the total load on the transformer. For full working of load 14 the tape resistor is completely rolled up. The lamp 19 between the two contacts 15b is then dark while the lamp over load 14 is bright. If the switch 16 is in top position, load 14 is cut off and the tape resistor 15 is across the secondary transformer terminals which are connected either in series or parallel according to the position of switch 13. The top position of switch 16 is only possible when the tape 14 is extended at least a certain length so that it cannot run too hot. This is ensured by a mechanical interlocking arrangement symbolized in FIGURE 1 by the bar 15a moving with the free tape end and bearing against a quadrant 16a on switch 16, thus preventing an upward movement of switch 16, until it has passed, that is until the minimum tape length is extended. The lower bar end cannot pass the plunger 16a when the tape resistor 15 rolls up and the bar 15a remains in front of the switch but allows the tape 15 to roll up completely. In the bottom position of switch 16 all loads are "off."

The tape resistor 15 is only indicated schematically as a resistor go and return line; in practice it is a heating film of the type described in my Patents Nos. 3,020,-378 and 3,033,970. The contacts 15b are preferably rollers.

The function of bar 15a is not only to prevent switch 16 being moved into an undesirable position, but also to prevent any switching being effected at all on the secondary side, on either switch 13 or 16, unless the tape 15 is fully or nearly fully extended. This further locking arrangement is indicated by sliding door 17. As long as the bar 15a is not holding it open against the force of a spring 17a, it covers up both switches 13 and 16 which therefore cannot be operated.

Naturally these interlocking means are only symbolically indicated in FIGURE 1 and any of the known practical locking devices can be used for the symbolized arrangement. The purpose is to ensure that the current at the switch contacts when the switches are operated is reduced to nil or to such a small value that very cheap and light duty switch contacts can safely and reliably be used.

There are fuses 18, indicator lamps 19 both primary and secondary, a thermostat 20 or a temperature controlled automatically resetting circuit breaker and proper earthing connections. When at the beginning of a heating cycle switch 13 is in the "series" position the transformer is heavily overloaded for a very short time. In this case the secondary supply voltage is twice the usual voltage which is obtained when both coils 11 and 12 are in parallel and consequently the wattage is quadrupled. The transformer and the external heating device 14 will consequently heat up very quickly and the device 20 will switch the mains supply off temporarily when the desired temperature is reached. As soon as this happens, the current supply to coil 8 via leads 9 is switched off. The flux change within the blocking plunger 13c drops and permits the spring 13a to pull the switch 13 into the "parallel" position shown in FIGURE 1 where it remains when the device 20 closes the primary circuit again. Spring 13a and plunger 13c are shown here only by way of symbols for standard blocking devices with proper resetting provisions. The latter can be manual or automatic when the temperature has dropped to a pre-set level.

Figure 2:
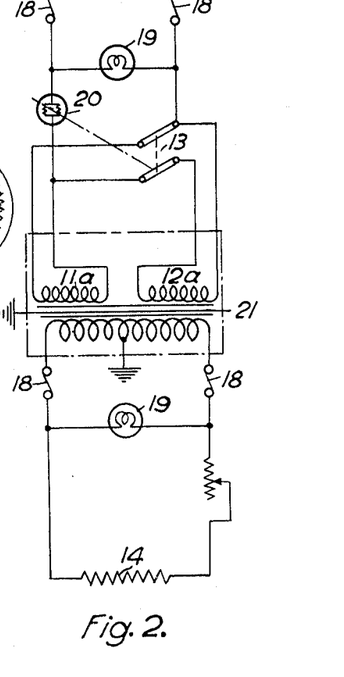

FIGURE 2 is a simplified circuit diagram of a heating system with a transformer having two primary coils 11a, 12a. The system operates with the switch 13 at first paralleling both coils; as soon as the thermostat or temperature controlled automatically resetting circuit breaker 20 breaks the primary circuit for the first time the switch 13 is pulled over into the position in which it connects both coils in series, thus reducing the load to ¼ of what it was before. The resetting of switch 13 for parallel connection of the coils is done manually or automatically when the transformer has cooled down sufficiently. The circuit gives a heating cycle suitable for very rapid heating up where the mains supply has sufficient capacity. This cycle can be made still more steep if two primary and two secondary coils are provided in series parallel connection giving load ratios of 16:4:1.

By way of example for space heating the transformer may be a single phase mains transformer of 3 kva. described below to dissipate up to 1 kw. directly as heat for space heating while the secondary output of at least 2 kw. is supplied usually at about 12 volts to a wall, ceiling, or floor covering, hereafter called "heated wallpaper," which consists of an aluminum foil pattern on a thin layer of plastic film or paper or between two such layers. This and other heated wallpapers and other heating devices which can be used in the heating system of the invention are described in my United States Patents Nos. 2,971,073, 3,020,378 and 3,033,970.

The use of the transformer itself to dissipate a substantial fraction of the energy supplied to it as heat, while enabling economy in materials to be achieved presents problems in transferring the heat to the space to be heated without additional heat dissipating devices at a suitable temperature and without endangering the transformer by the development of excessive temperatures within it. To enable the heat to be conducted to the exterior, the transformer is designed so that the major part of the loss and therefore the heat developed is in the windings and not in the core, and the windings themselves are single layer helicoids made from thin flat conductors "wound on edge," that is with their width substantially at right angles to the core axis. They either have the outer edges bare or at most with only a thin coating of insulation. Thus the heat is conducted to these outer edges without numerous layers of electrical insulation (which in general would be bad conductors of heat) being interposed in the heat path. Also since the windings are single layer, the radial width of each winding is relatively great thus giving the winding as a whole a relatively large outer surface through which the heat is transmitted to the surface which radiates the heat. The inner edge of each layer also contributes to the cooling surface as the core losses are kept small. The heat radiating surface may be constituted by a metal panel or plates or castings in good heat conductive contact through one layer of insulation with at least the major part of the surface of the coils and suitably also with the core, but preferably the transformer or at least the coils are enclosed in a canister and the intervening space filled with a suitable fluid medium in which the coils are immersed. Even if the canister is hermetically closed its walls may be arranged to permit deformation by the expanding hot fluid. If the canister does not present sufficient external surface to radiate the heat generated within the transformer without a dangerous temperature being developed, an enclosure of highly heat conductive material is provided which makes good heat conductive contact substantially all over the canister and provides a good heat conductive path to its external surface which is of an area capable of radiating the heat under the desired temperature conditions within the transformer and is of a shape suitable for the purpose of the heating system. In some cases such an enclosure can be used in direct contact with the transformer.

An alternative to the liquid filling or combined with it and/or the large area heat radiator is the use of aluminium oxide or of a similar inorganic powder consisting of minute high temperature enduring particles with at least an insulating skin or surface in a dense packing compacted round the coils. If a canister is used containing the powder the minute spaces between the compacted particles can be filled with an insulating liquid or vapour.

Figure 3:
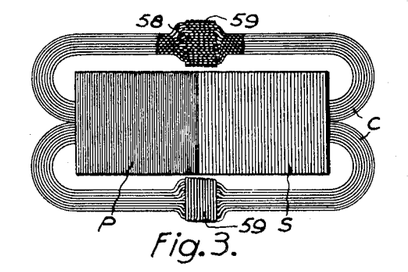
FIG. 3 is a side view and FIG. 4 an end view showing in principle a transformer according to the invention.
Figure 4:
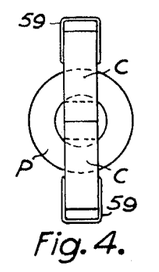

FIGS. 3 and 4 illustrate diagrammatically and in principle one convenient layout of the transformer according to the invention.

Here the primary and secondary windings P and S are each a single layer wound from thin flat conductors, set with their widths radially i.e. perpendicular to the axis of of the core C of strip material and placed end to end on the core. Such windings can briefly be referred to as "edge wound." The windings P and S are here shown separate but usually they will be sectionalised and the sections alternated to reduce magnetic leakage, as will be described below in reference to other examples.

Figure 5:
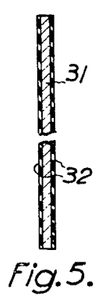
FIGS. 5, 6 and 7 are cross sections illustrating three simple forms of conductor used in the transformer windings.
Figure 6:
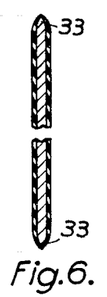
Figure 7:
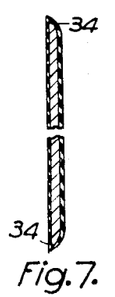

FIGS. 5, 6 and 7 show in principle three possible cross-sections of turn of the windings. The simplest is a plain rectangular form 31 shown in FIG. 5 and provided with insulation 32 on the wide surfaces, leaving the narrow edges bare. Preferably however the edges are thinned suitably by swaging or otherwise, so compressing the metal grain structure along the edges. This thinning may be symmetrical as at 33, FIG. 6 or asymmetrical with both edges thinned from one side as at 34 FIG. 7. A possible modification is a strip thinned symmetrically on one edge as in FIG. 6 and asymmetrically on the other as in FIG. 7. Another possible modification is a strip thinned asymmetrically but from opposite sides on opposite edges.

These thinned edges substantially reduce the risk of shorting across the edges of adjacent turns due to slight burrs or of damaging the insulation on the edges between turns and even permits leaving the outer edges bare so that there is no impediment to the outward transmisssion of heat. The staggering of the edges of adjacent turns described below can be used with these simple cross-sections of turn. Also a thin coating may be provided extending over the edge without introducing the substantial impedance to the heat flow created by the multitude of insulating layers used in conventional transformer windings. Even such a single coating however can be eliminated at the outer edges by providing separate insulation between the turns which projects a little outwardly beyond their edges. The same provision can also be made for the inner edges of bare conductors. Such separate insulation examples of which are described below, usually constitutes a second layer which avoids any risk of short circuiting of turns through pin holes in the insulating coating on the conductor itself.

Figure 8:
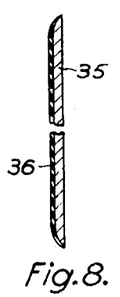
FIGS. 8 to 16 are cross sections of conductors which are wound after longitudinal folding, FIGS. 8, 10, 12 and 15 showing the conductors before folding and FIGS. 9, 11, 13, 14 and 16 the conductors after folding.
Figure 9:
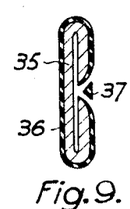

Instead of simple cross-sections, longitudinally folded conductors may be used. Thus as in FIG. 8, a conductor 35 with thinned edges coated on one side with a thin layer of insulation 36 is folded symmetrically to bring the insulation on the outside and to form what amounts to a flattened tube with an open joint as shown in FIG. 9. This conductor may be provided with an insulating filler piece 37 in the space between the adjacent thinned edges.

Figures 10, 12:
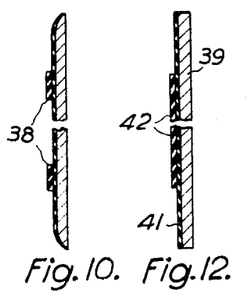
Figure 11:
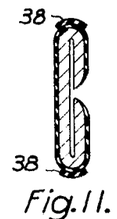

FIGS. 10 and 11 are similar to FIGS. 9 and 10 but extra bands 38 of insulation are provided which cover the edges of the folded strip. It will be understood that the thickness of the insulation is much exaggerated in this and similar figures and even with these bands there will be no serious impediment to the heat flow.

Figure 13:
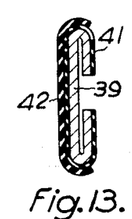

Another folded strip 39 with square instead of thinned edges is shown in FIGS. 12 and 13 before and after folding respectively. This is shown with a coating 41 of insulation of full width on one side and a second narrower band 42 of insulation superposed the folding being effected so that the insulation comes on the outside and the width of the band 42 being such that it just overlaps what become the edges of the folded conductor. Once again the thickness of the insulation is exaggerated.

In FIGS. 8 to 13 the edges of the folded conductor have a favourable rounded uncut section but the outward flow of half the heat developed has to be transmitted through a single thickness of the metal strip at the central zone. This can be mitigated by folding the metal strip asymmetrically as in FIG. 14. There is still a zone of only single thickness but this only has to conduct a comparatively small proportion of the total heat provided the edge 43 to which the gap 44 is nearer is on the core side in the transformer.

Figures 14, 15, 16, 17:
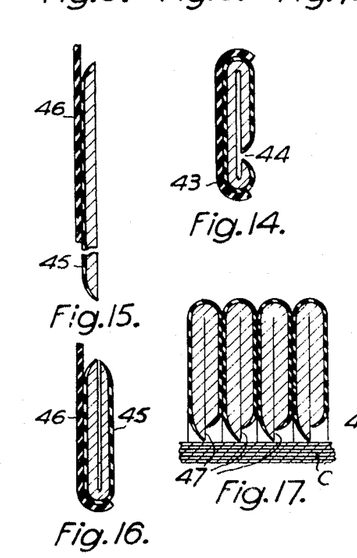
FIGS. 17 to 21 illustrate further details of folded conductors.

This restriction in the heat flow is entirely avoided with a conductor folded along the centre line of the strip. This is illustrated by FIGS. 15 and 16 in which the strip provided with a coating of insulation 45 on one side and a superposed strip 46 of insulation as shown in FIG. 15 is folded on the centre line to produce the structure of FIG. 16 having the insulation on the outside. The width of the strip 46 and its location are such that it extends just over the fold, covering the edge, and extends beyond the other edge of the conductor. Thus when the conductor is wound the insulation projects between adjacent turns on one surface of the coil, considerably reducing the risk of short circuits or local damage. This edge will in this case be the outer, and it leaves the surface through which the heat leaves the coil with the minimum insulating covering.

In these two figures asymmetrically thinned conductor edges are shown, so disposed that the folded conductor is symmetrically thinned on one edge as well as being rounded on the other and the projecting insulation is therefore not essential though desirable. Instead of folding on the centre line the strip may be folded a little to one side of the centre, producing a folded section as in FIG. 17, one edge overlapping the other as at 47. This reduces the risk of short circuits between adjacent turns or damage to the insulation and is therefore more reliable than the section of FIG. 16, if the additional insulation 46 of FIG. 16 is to be dispensed with, and the winding should be made so that the overlapped edges are towards the core indicated at C.

Figures 18, 19:
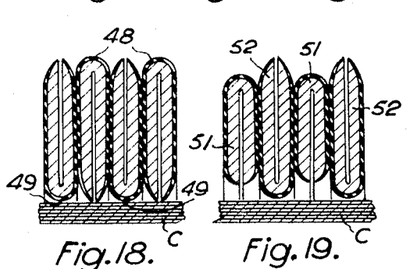

Another possibility which reduces risks without additional insulation also employs conductors folded on the centre line, but disposed so that the fold is alternately on opposite edges at 48, 49 respectively in FIG. 18. This cannot, or cannot conveniently, be done in a winding made from a simple continuous strip but methods of achieving it will be described later.

Figure 20:
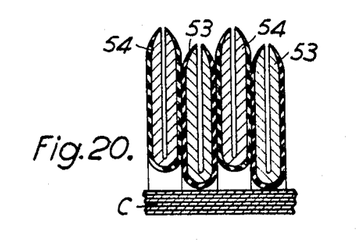

Other schemes which reduce the risk of short-circuiting or damage at the edges consist in relatively staggering the edges of adjacent turns as in FIGS. 19 and 20.

In FIG. 19 this is achieved by making alternate conductors 51, 52 narrow and wide respectively while in FIG. 20 this is achieved by making the conductors all of the same width but locating alternate conductors 53, 54 respectively closer to and further from the core C. The structure of FIG. 19 cannot be achieved with a continuous conductor of constant width but methods of achieving it will be described. Advantage of these methods has been taken also to dispose the folds on opposite edges alternately.

Figure 21:
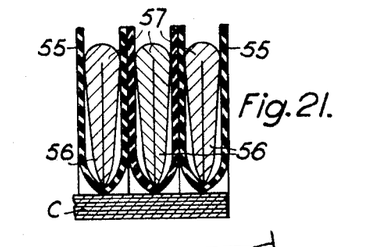

FIG. 21 shows separate insulation 55 used with folded bare conductors 56. The insulation itself is folded into a U-section with the limbs projecting beyond the outer edges of the conductors, the core being at C. In this particular example the fold 57 forms the outer edge of the conductor but the reverse arrangement is possible.

FIG. 21 also shows another desirable feature, namely the tapering of the section of the conductor from a less thickness adjacent the core to a greater thickness at the outer edge, thus better suiting the cross-section to the heat flow.

It is to be understood that various features of the embodiments of FIGS. 5 to 21 can be used together, e.g. a square edged conductor in FIG. 14 onwards, a filler strip such as 37 in FIGS. 11 and 14, extra bands of insulation such as 38 in FIG. 14, additional insulation such as 46, and the U-shaped additional insulation 55. Again the staggering of FIGS. 19 or 20 or the tapering of the section as in FIG. 21 can be used with conductors of most of the forms illustrated.

Windings can be made from the various sectioned conductors shown in FIGS. 5 to 17, 20 and 21 by winding them on edge in a similar manner to that used in the manufacture of gilled tubes except that the conductor is not or not permanently lodged in a groove in the mandrel and after the winding has been made the mandrel is removed. This produces a helicoid of annular circular form. The transformer core is introduced after winding, in the form of separate strips of steel of appropriate quality. The ends of the strips may be interleaved and lapped as at 58 in FIG. 3 and then held firmly pressed together for instance by a binding 59 or by synthetic resin. Methods of making such assemblies almost automatically and other methods of closing the core will be described below.

Windings with folds on opposite edges alternately as in FIG. 18 or of smaller or greater width alternately as in FIG. 19 will be made up of pieces, and windings with the other forms of folded conductor can also be made up of pieces. The helicoids so produced will usually be of polygonal, commonly rectangular form.

In principle the winding is made up of pieces of strip material which are joined together outside the core window by lap joints of the full width of the strip and are held under axial compression. By cutting away one area of each folded strip where they are to be lapped, preferably prior to folding, the thickness at the joints will be the same as the thickness elsewhere. As will be shown the pieces of strip may be of such shape that they can be cut out of thin metal sheet, often of foil thickness, substantially without waste. The strip material may further be provided with a relatively fusible metallic layer on its uninsulated surface at least in the area where it makes a lap joint with another piece and by the application of heat for example by passing a current through the strip the joint can be soldered or brazed acording to the material of the fusible metallic layer. If desired such layer can extend to other regions and indeed over the whole strip, so that all folded areas can be metallically joined. When the winding is made up of pieces the core may be closed first or be a closed core and the winding be assembled on it. Specific examples of transformer so constructed will be described below but first some methods of producing such windings from thin sheet metal will be described in general terms.

Figures 22, 23:
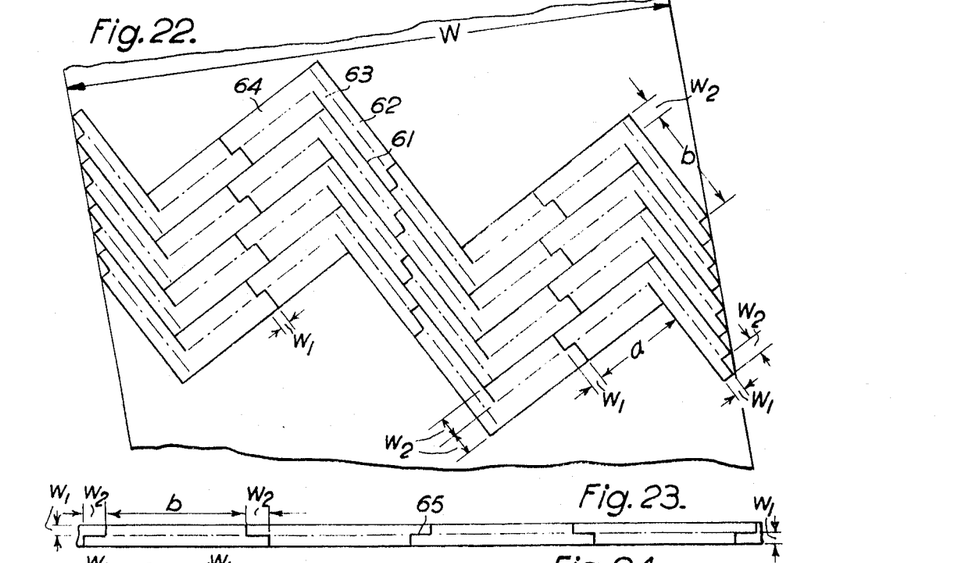
FIG. 22 illustrates the production of conductors made in pieces and assembled to form windings.
FIGS. 23 and 24 illustrate another manner of production of conductors made in pieces and assembled to form windings.

FIGURE 22 illustrates a succession of shaped pieces of conductor which can be cut from material of width W with only minor waste at the edges and at the beginning and end of a long metallic web. The solid lines indicate actual cuts while the chain lines indicate the lines on which the severed material is folded. It is assumed that the winding is a helicoid of rectangular outline of clear dimensions $a$, $b$ and that the width of the conductive strip after folding is alternately narrower where it will be within the core window and wider in alternate sides of the rectangle where it will be outside the core window.

Each piece is of generally L-form but the inner border 61 of one limb 62 continues as a cut 63 half way across the other limb 64. The final width in this example of the limb 62 after folding is $w_1$ and the final width of the limb 64 after folding is $w_2$. To provide full width lap joints the ends of the limbs are stepped. Thus the limbs 62 are stepped by a distance $w_2$ greater than the length desired measured from the centre line of the limb 64 while the limbs 64 are stepped by the length $w_1$ beyond the length $a$ measured from the inner border of the limb 62. When the limbs are separated the outer half of the limb 62 is doubled over on the folding line leaving a single thickness of width $w_1$ and length $w_2$ projecting at its end while the limb 64 is doubled on the folding line leaving a single thickness of length $w_1$ and width $w_2$ projecting. In this particular example the folding is done so that in the limb 62 the fold lies on the outside edge while in the limb 64 the fold is on the inside edge. The edge formed by the cut 63 lies alongside the inwardly folded edge of the limb 62. Also both single thicknesses projecting at the ends of the two limbs lie in the same plane. The pieces so cut and folded are assembled into a helicoid in which the projecting portion at the end of each limb overlaps in exact register with the projecting piece of the limb of the next piece thus forming lap joints. There will be a lap joint at every alternate corner i.e. two joints per turn of a helicoid and at each successive side the fold will be alternately on the inside and outside but as will be clear to those skilled in the art, other dispositions of the cuts and folds are possible which will give the desired full width overlapped joints. It will also be clear that the relative widths of the alternate sides of the rectangle can be different and the proportions of the rectangle itself according to the dimensions and proportions of the transformer being made.

Figure 24:
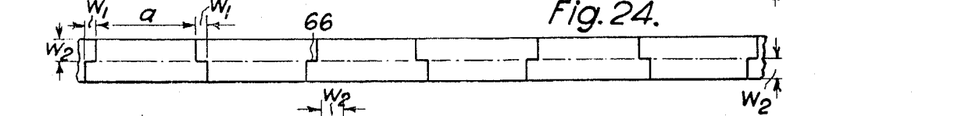

If a lap joint at every corner is acceptable the material can be cut without any waste from two strips of the form indicated by the solid lines in FIGS. 23 and 24 respectively. One strip is of width $2w_1$ and the other of $2w_2$. The cuts 65 in the one strip are stepped and are of length $w_2$ while the cuts 66 in the other strip are stepped and are of length $w_1$. In both cases the cut pieces are folded on the centre line and full width joints can be made at each corner of the helicoid.

Figure 25:
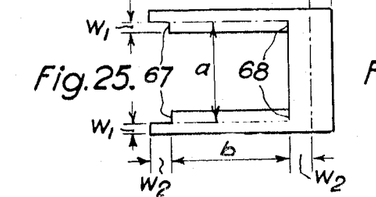
FIGS. 25 and 26 illustrate further manners of production of conductors made in pieces and assembled to form windings.

FIG. 25 illustrates a piece of sheet metal used in a scheme in which there are again only two joints per turn though this may cause substantial waste of material unless the dimensions are particularly favourable. The piece illustrated is of U-form cut with steps 67 on the end of each limb and a part cut 68 across at the base end of each limb. The lengths and widths are marked and the fold lines indicated in dotted lines. The turns are completed by pieces of the same form as in FIG. 24 and the mode of assembly and result will be apparent without further description.

Figure 26:
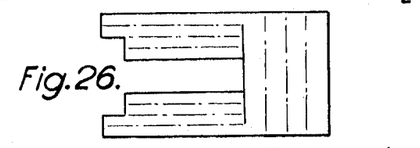

The wastage involved by the form of FIG. 25 can be reduced by using thinner material and multiple folding. Thus a similar final shape to that obtained with FIG. 25 can be obtained with pieces of material of half the thickness, cut out to the shape shown in FIG. 26 and folding each limb and the base on the chain lines into quadruple layers.

The interturn insulation of the windings can be effected in various ways and using various materials. The edge-on helicoidal form of the coils presents certain problems, but also has considerable advantages.

The purpose of single-layer edge wound coils as above mentioned is to facilitate the outward flow of the heat generated in one or other or both windings, the loss in the transformer being mainly that in such winding or windings. Specifically the proportions may be such that the total heat dissipating surface area (i.e. essentially the total area of the edges, particularly the outer edges, of the turns of the winding) is less than 1 square inch per watt lost in the winding when it continuously carries its full load current. To enable the heat to be carried away mainly through the outer edges without excessive temperature rise within the transformer there must not be more than a thin layer of electrical insulation on the outer edges and these edges may even be bare. In such cases for a dissipating surface area of 1 square inch per watt lost at continuous full load, the surface temperature would at least be of the order of 60–70° C. above ambient still air.

The provision of interturn insulation, being between flat surfaces, presents a problem which admits of a highly advantageous relatively simple solution while difficulties at the edges may be eased as above mentioned by thinning the edges, relatively staggering adjacent turns or allowing separate insulation (i.e. not consisting of adherent coatings) to project a little beyond the edges of the turns, or by the simultaneous use of two or all three of these possibilities with or without adherent coatings on the conductor.

Figure 27:
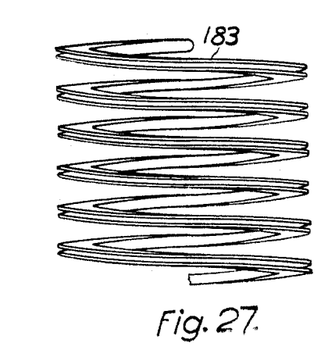
FIGS. 27 and 28 illustrate forms of separate insulation used with certain forms of winding.
Figure 28:
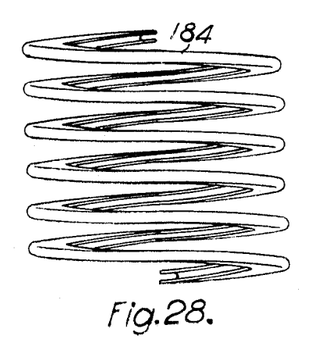

A particularly suitable separate insulation, which can be used alone is of U-section as in FIG. 21 and where the helicoid is a continuously wound conductor such an insulator may be produced of corresponding form, usually with the fold 63 on the inside as in FIG. 27 or in special cases with the fold 64 on the outside as in FIG. 28. Such a continuous insulating strip which need only have some flexibility is easily applied to the turns of the conductor without substantial relative sliding. A single layer helicoid of insulating material of some flexibility can similarly be fed between the turns of the conductor without substantial relative sliding. As compared with the insulation applied to conventional toroidal coils, a better space factor is achieved and only a limited flexibility of the insulating material is required.

Any insulating material which can be prefabricated to the required form and the small degree of flexibility necessary can be used. It is to be noted that as compared with conventional transformer insulation, no severe deformations, tensile stresses or abrasion are imposed on the insulation; once in place it is simply put under direct compression when the coil is axially compressed and this in itself imposes much less limitation on the choice of material than with usual transformers. Insulating plastics materials which can be shaped when hot or be extruded in the required helicoid form are well known, for example polyvinyl chloride and other polymers which have higher temperature endurance. But such materials as asbestos paper, glass fibre or other felted or like structures can readily be produced to the required helicoid form (including helicoids of U-section) by providing a suitably shaped and moved paper-machine strainer or equivalent. Fibrous materials in yarn form for example of asbestos or glass can readily be woven to the required form by the use of narrow-ware looms with separately reeled warps and conical draw off rollers and if woven in tubular form and slit along the appropriate edge, with suitable protection if need be of the severed edges, will provide the forms shown in FIGS. 27 and 28.

Figure 29:
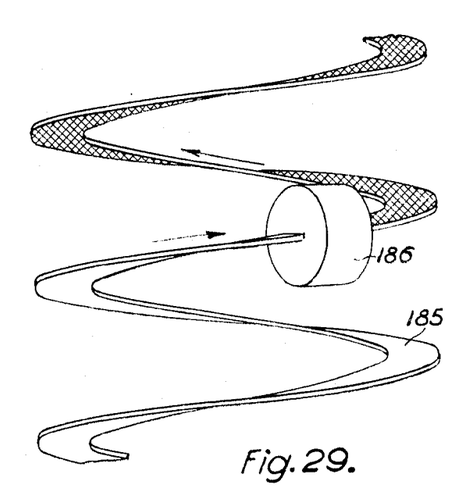
FIG. 29 illustrates the application of braided insulation to the conductor.

If the coil is subsequently to be impregnated with varnish, resin or the like, or is immersed in a di-electric liquid when in use, the separate helicoidal insulation should be porous or loose in structure and becomes no more than a spacer which eases the problem of its production and widens the range of materials which can be used. Another possibility for such cases is to braid yarn around the helicoid which is readily effected simply by passing the helicoid conductor 65, FIG. 29 through a miniaturised braiding head 66 in a helicoidal path. The braiding head itself may be constructed on the lines of well known braiding heads and therefore does not require any particular illustration or description.

Where the conductor helicoid is made up in pieces as described with reference to FIGS. 22 to 26 above and with reference to FIGS. 43 and 44 below, separate insulation (or spacing material) can be cut into correspondingly shaped, slightly wider, pieces and interleaved with the pieces of conductor being if desired also secured thereto by adhesive. However it would be possible to produce some forms of insulation even in continuous separate helicoidal formation for interturn assembly with a conductor helicoid in pieces.

In the case of adherent coatings of insulation the invention affords advantageous methods and choice of materials. The avoidance of any severe deformation, tensile stresses and abrasion above noted, enables relatively brittle materials and materials which could not satisfactorily be deformed, or materials which would hinder the winding of wire coils, also to be used, by applying them as coatings. The invention thus substantially expands the scope of the transformer and reduces insulation costs especially of high-temperature enduring insulation. Like prefabricated helicoidal insulation above described, such coatings can be applied to the conductor strip already formed into a helicoid, or part of a helicoid.

In the category of materials which can be used in this way may be mentioned layers produced on aluminum by anodising, high temperature enamels whether "burnt on" or vitreous, and comminuted inorganic materials held by adhesive such as particles of aluminum oxide, and particles, flakes, flocks or fibres of thin mica, asbestos or glass.

A particular advantage of the edge-on helicoidal coil is that insulation applied in fluid form is almost wholly applied to flat surfaces and not (as with wire conductors) surfaces which in cross-section are of short radius of curvature. Also ready access can be had to the surface of any turns even after the helicoid is formed, almost up to the final axial compression of the coil when on the transformer. Another most important advantage is that the whole coil or a part of it can be handled as a single piece or alternatively the helicoid can be processed in a continuous sequence turn by turn, and stage by stage, any desired number of turns being treated in any stage simultaneously. During the processing the turns are axially spaced somewhat from each other so that the whole surface to be insulated is accessible to treatment until the insulation becomes electrically testable and the coil is finally made by axially compressing the helicoid without subjecting the insulating layer to substantial shearing stresses.

By way of example continuous processing will now be described with reference to a plant layout diagrammatically illustrated in FIGS. 30 and 31. The production of the helicoid itself (on the lines e.g. of gilled tube production above mentioned) precedes the stages of FIGS. 30 and 31. The helicoid may enter the processing as it is made or be drawn from precoiled formed helicoidal stock material stored in as great length as can be produced or may be convenient.

The figures assume stations for various stages of treatment all of which will be described but some of which may be omitted according to circumstances.

Figure 30:
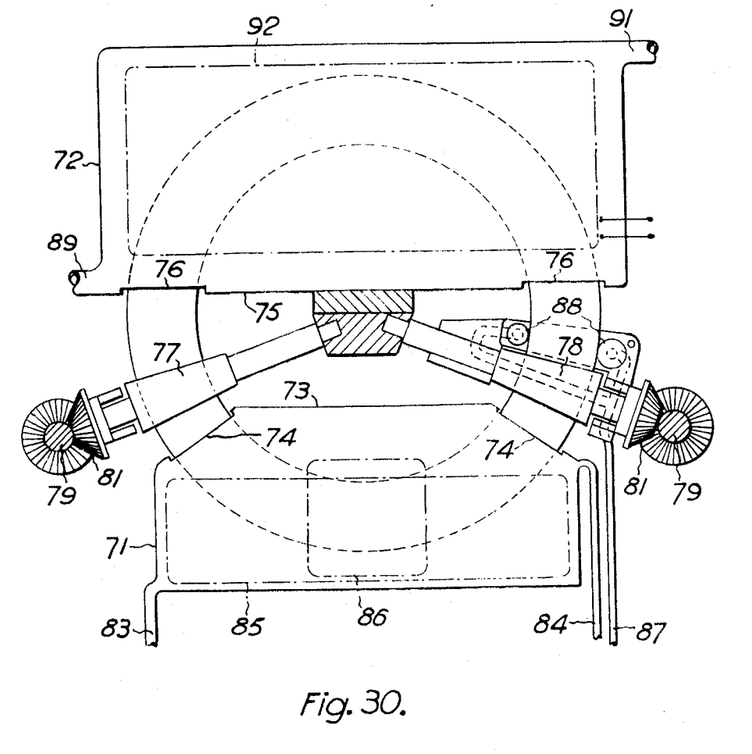

The various stations comprise lower containers such as 71 and also covers such as 72, FIG. 30. The containers can be raised and lowered and have closures 73 slotted at 74 for the entry and exit of the helicoid. The covers can be raised and lowered or may be hinged to swing to the side. They have bottom closures 75 slotted at 76 for the entry and exit of the helicoid. At suitable intervals in the series space is left between the containers and covers for pairs of opposed conical driving rollers 77, 78 driven in any suitable way, for example from side shafts 79 and bevel gears 81. The helicoid which may be supported for example on a bar indicated at 82, FIG. 31, passes between the respective pairs of conical rollers and is so drawn through the processing stages. Pairs of driving rollers are provided at as frequent intervals as may be necessary. Elsewhere the containers and covers may meet to form a complete enclosure, and if conditions in any particular stage permit the slotted closures 73, 75 may be omitted.

In general the containers are used for containing liquids and are provided with a supply pipe 83 and an overflow flow pipe 84 by which the liquid may be circulated (from and to tanks, not shown, by pumps, not shown, or other suitable means) and the level maintained. Electrical heating elements 85 may be provided on the container inner walls, and there may be brushes, doctor blades or the like indicated at 86 for applying and spreading the liquid to the helicoid in the container. Alternatively in one or more containers electrostatic precipitation may be used in which case electrodes will be provided in place of the above applying and spreading devices. Another alternative is the use of a "fluidised" bed technique to apply the material for the coating in powder form. Further application to the wide surfaces may be effected by making the rollers 78 porous and supplying liquid under pressure to them axially by the aid of pipes 87; the liquid may also be fed to two further porous rollers 88, by which liquid is applied to the edges of the helicoid. The term liquid used above is to be broadly understood and as will be made clear, it includes in particular thixotropic preparations.

In general the covers are used for the passage or circulation of gases, especially air, for drying for instance under super or subatmospheric pressure. Connections 89, 91 are provided together with blowers, pumps, compressors, exhausters or the like, not shown. The inner wall of the covers may be provided with electrical heating elements 92. Electric heating elements are also provided as necessary in the various air and liquid lines. To simplify the drawings, the spaces between the covers and the driving rollers have been omitted from FIG. 31.

If the stock helicoid material is soiled or greasy it is cleaned in the first set of containers 71a by such agents as trichlorethylene, acid or other pickle, hot and cold water, with intervening drying and final drying by hot air. The second cover 72a in this section may be partly of glass to permit visual inspection.

In the next set of containers 71b the liquid coating is applied by mere passage or preferably by the aid of the devices 86 and the rollers 78, 88 or by electrostatic precipitation. The liquid is a thixotropic preparation and by choice of its composition and the temperature of application it is applied as a very thin film which gels sufficiently not to drip off the edges of the helicoid, which thus remain covered, and which after any necessary setting will not soften below 100° C.

One suitable composition is a solventless amine-cured epoxy resin (as obtainable under the trade name Araldite MY 750 with Hardener HT 972 from C.I.B.A. (A.R.L.) Duxford, Cambridge, England) to which have been added a silica gelling agent (as obtainable commercially under the name Santocell from Monsanto Chemicals) and fine flaky wet-ground mica powder, suitably applied at 100° C. When cured this gives a coating which will withstand a temperature of 160° C.

Other thixotropic compositions which can be applied at room temperature are of a similar nature to printing inks such as linseed oil based litho or letterpress inks incorporating inorganic pigments and which can be "burned in." A further possibility is the fish glue and other glues used in photo-engraving for the thin light-sensitive coating on printing plates which are subsequently burned in to produce acid resisting, so-called "enamel" coatings. For the present purpose improved results are obtained by the addition of waterglass or other water soluble film formers to the glue.

Yet other possibilities are the ceramic frits used in vitreous enamelling of aluminium.

In general a gelling agent will be incorporated in all of these thixotropic compositions such as a silica based agent as already mentioned. Others are aluminium stearate (as obtainable commercially under the trade name Higel from A. Boake Roberts and Co. Ltd. of Carpenters Road, London E. 15, England) and those based on bentonites (as obtainable commercially under the trade name Bentones from the National Lead Corporation of New York). The choice and proportion will depend on the individual case. By proceeding in this way very thin even coatings covering the edges of the helicoid and with few, if any, pinholes can be obtained.

The coating produced in the containers 71b while still tacky may be dusted with a finely comminuted inorganic substance in the section 71c. Suitable substances are very fine (900 mesh) iron-free aluminium oxide powder, flaky mica powder and asbestos powder or flock. The comminuted material may be "fluidised" i.e. suspended in an upward current of air in the first container 71c delivered through a nozzle system 93. Alternatively the powder may be pressed or dabbed on mechanically by rollers, brushes or the like. Desirably after the powder has been applied the helicoid strip is vibrated to shake off loose powder. This may be done by sharply pulsating exhaustion of the first cover 72c into which the strip passes directly from the first container 71c.

Dusting of the coated strip is optional but is desirable if liberal spacing of the turns of the winding is wanted. Whether it is done or not, burning in of the coating is usually highly desirable and may be performed in the next container 71d which is provided with heating means (gas fired or electric) indicated at 94. The technique is essentially the same as the burning in of the fish glue coating of a printing block but the specific time and temperature will depend on the precise composition of the coating and to some extent on the metal of which the strip is made. There will usually be a colour change which provides a convenient visual control. Care must be taken to cut off the heat if for any reason the steady progress of the strip has to be checked at any time.

Burning in not only improves the adhesion and the mechanical and chemical resistance of the coating with most of the thixotropic compositions above mentioned, but also enables a simple glue layer itself to be used to form a highly effective extremely thin interturn insulation in the form of an enamel while the distinct colour change which occurs provides a self-indicating control of the burning in operation.

A pair of driving rollers is desirably provided (77d, FIG. 31) at the exit from the section 71d which are included in a resistance measuring circuit thereby enabling the insulation resistance of the coating to be tested. This circuit may include a recording instrument and other controls.

Figure 31:
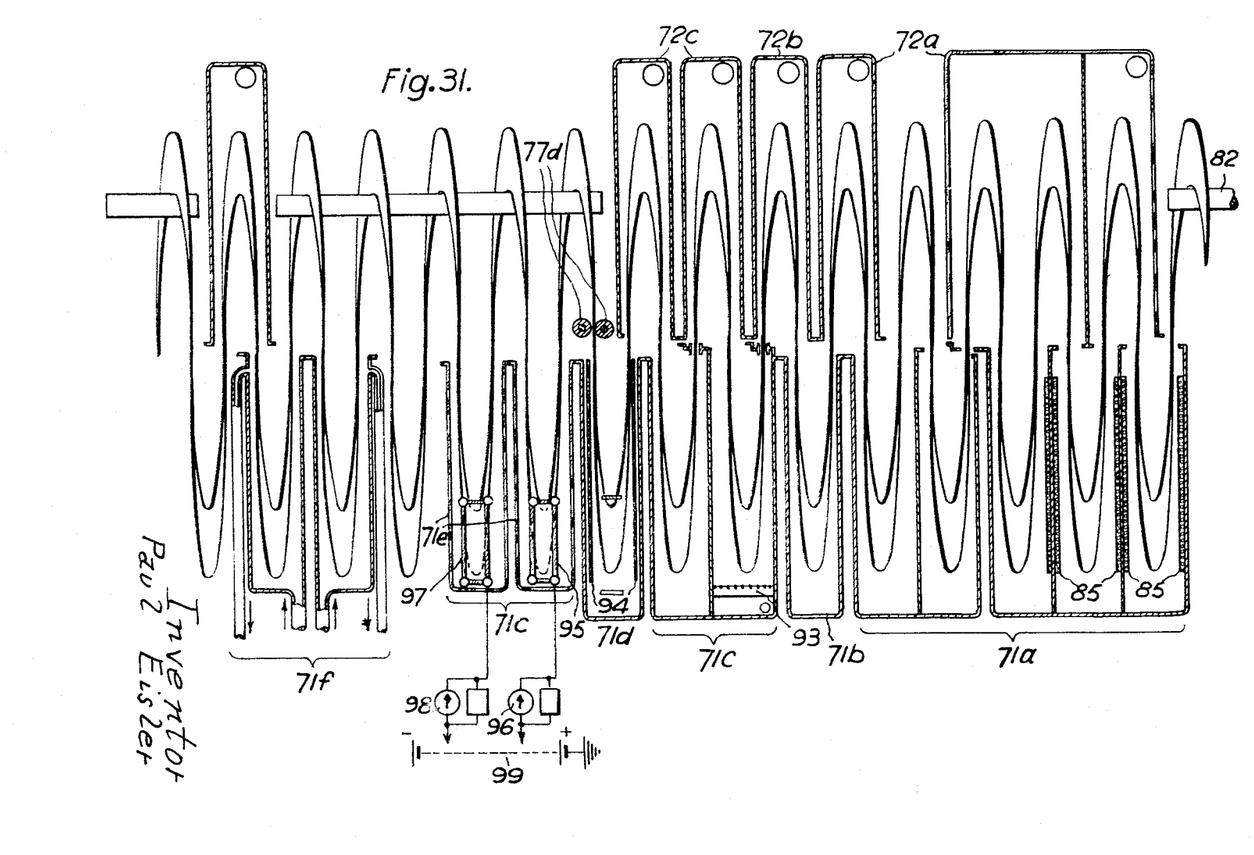

The plant shown in FIG. 31 also includes a further section in which further tests and the rectification of minor faults is effected, suitably by etching or by producing a covering of bare areas with a non-conductive layer derived from an ionic metal surface treatment process. The first container 71e is made of glass or other suitable material and contains an electrolytic etching agent say ammonium chloride solution for copper strips, an air supply and a cathode 95. The helicoid strip is earthed and the cathode is maintained at a negative D.C. potential somewhat higher than normal in electrolytic etching say —12 volts. An ammeter 96 (which is preferably a recording instrument) is included in the circuit. Current only flows and is indicated if there is a bare area on the portion of strip in the bath and the value of the current is related to the total immersed bare area. A copper strip during its traverse will have the bare areas etched below the rest of the surface and undercut so that the areas become slightly enlarged with a halo of insulation extending over the edge of the etched area. This step is the main treatment with a copper strip but it can be omitted with aluminium or used as a detecting and pretreating step.

Alternatively to electrolytic etching, chemical etching say in ferric chloride solution could be used but the advantage of the detection of faults by the ammeter is lost.

The second container 71e again of glass or the like contains an anodising solution such as sulphuric acid, an air supply and an insoluble cathode 97 at a somewhat higher negative potential than usual for anodising, say minus 20 volts or more with an ammeter 98 (preferably a recording instrument) in circuit. This stage constitutes the major rectification in the case of aluminium strip, any bare areas being anodised in this stage and thus given an insulating coating. Electricity supplies for the two containers 71e are indicated in the form of a battery 99 but any suitable source of D.C. may be used. The cathode may be located to produce a greater concentration of current and thus a thicker anodised layer at the edges of the strip.

As already noted the potential difference employed in the containers 71e is made somewhat greater than usual. In general, in the electrolytic processes to which the helicoid is subjected, the potential difference between the part which is being treated serving as the anode and the cathode is desirably made greater than the maximum interturn potential difference arising in the part of the transformer windings for which this part of the helicoid is destined. In this way the electrolytic process itself subjects the helicoid to more severe conditions than the ultimate operating conditions and thus constitutes an added precaution.

As in standard metal-finishing practice the strip is rinsed in cold and hot water and dried in hot air after the electrolytic treatment, two containers and covers being indicated in the section 71f for the purpose. If desired such rinsing and drying may be interposed between the two electrolytic treatments.

In the case of aluminium helicoid strip, anodising alone, or anodising and lacquering may be used to provide the insulation of the strip. Then the section 71b, 71c would be omitted and the first electrolytic treatment, while the lacquering stage if wanted would follow anodising. Testing of the insulation by the rollers 77d would follow anodising or lacquering or both. The general rules of continuous processes for anodising and for anodising and lacquering are well known in industry (see for instance ""The Practical Anodising of Aluminium," Hubner and Schiltknecht, translated by W. Lewis, London, Macdonald and Evans, 1960, p. 206 ff.) and their adaptation to the helicoidal strip passing through any sequence of treatments requires no further details here.

Figure 32:
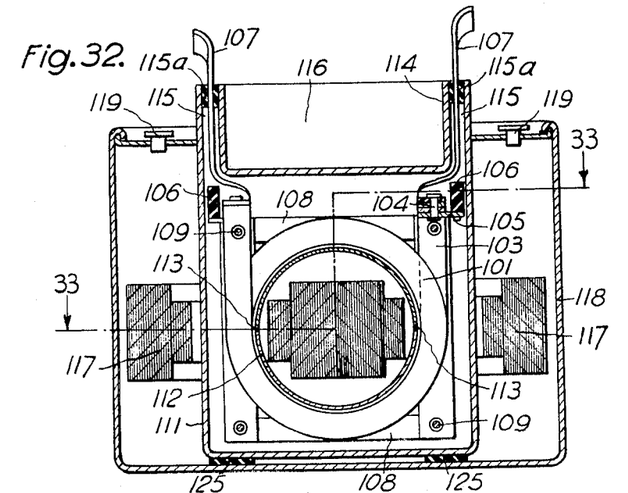
FIG. 32 is an end view in section and FIG. 33 a section on the line 33—33 of FIG. 32 of a construction of transformer according to the invention.
Figure 33:
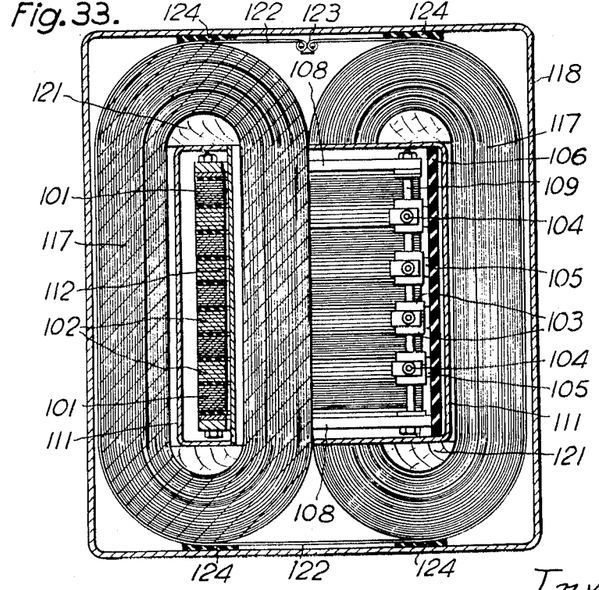

A construction of transformer and heat dissipator using the helicoid coils of the nature above described is shown in FIG. 32 and 33.

In this example, the coils are pre-wound helicoids of circular form, primary coils 101 alternating with secondary coils 102. The respective sets of coils are connected in series, the strip conductor from which the coils are made being left with a straight piece 103 at each end which serves to make the interconnections and terminal connections. Interconnections may be made by bending over the two conductor ends, superposing them and clamping them together, for example by bolts 104, Brackets 105 support the joints from bars 106 of insulation. To the ends of each series are similarly connected terminal strips 107. The coils are held under axial compression between heavy straight bars 108 at the ends, drawn tight by bolts 109 or the like.

The coils are housed in a canister 11 having a tube 112 which extends from one end to the other. This tube is inserted after coils have been placed in the canister because it must pass through the pre-wound coils and its ends are sealed into corresponding openings in the end walls of the canister. The tube is divided circumferentially into two pieces electrically insulated from one another at 113 to avoid producing a closed turn which would form a short-circuited single turn winding in which a heavy current would circulate.

The top of the canister 111 is closed by a cover 114 and passages 115 are left for the terminal strips 107 to pass out of the canister. Insulating packing 115a is provided around the strips 107 but if the canister is disposed as shown these need not make a fluid tight seal though they can do so if necessary. To assist in dissipating the heat the cover may have closely spaced deep parallel ribs one of which is indicated at 116.

The core 117 is made up from inserted strips of steel. As shown strips of two different width are used to give a cross section to the core which is a somewhat closer approach to the circular passage through the windings than possible with strip all the same width and closer approximations to the circular sections can be made if desired. The two halves of the core may be closed as described below.

The assembly of the canister 111 with the coils and core and its cover 114 stands in an outer canister 118.

The canister 111 is filled with a di-electric liquid approximately to the level of the cover. This may be transformer oil but it is preferably an askarel such as "Aroclor" or "Pyroclor" supplied by Monsanto Chemicals Ltd., Victoria Street, London SW. 1. The outer canister 118 is filled with water which also circulates between the core and the tube 112 and though it need not be hermetically sealed it is provided with stoppers such as rubber plugs 119 in the cover. The liquid in the two canisters serves to convey the heat to the walls of the canister 118 and to the ribbed cover 114 of the canister 111.

Provision is made to hold all the parts steady to avoid vibration and noise and using the axial compression members to hold the actual coils clear of the tube 112 and the canister 111. The coils are firmly clamped by the bars 108 which serve to located the coils in the correct position in the canister 111. There is some clearance between the inner edges of the coils and the tube 112 in which the di-electric liquid can circulate. Wedges 121 serve to hold the canister 111 in relation to the core. The two halves of the core are encircled by a steel strap 122 the ends of which are held together by a clamping device 123 which enables the strap to be drawn taut. Further wedeges 124 locate the core in relation to the canister 118 while the latter also stands on resilient feet 125. The various wedges and feet may be made of such material as neoprene.

If neither canister is hermetrically sealed no difficulties will be caused by the expansion and contraction of the liquid fillings with temperature changes, but in any case it will be noted that both canisters have flat sides and accordingly if the material of which they are made is not too thick such expansions and contractions are readily accommodated by flexing of these sides. As explained below if the total heat dissipating surface presented by the canister 118 and cover 114 with its ribs 116 is insufficient in any particular case, the ribs 116 may be omitted and the whole structure provided with a highly heat conductive body in close contact and itself presenting an adequate surface to dissipate the heat.

The closing of the core strips of the transformer shown in FIGS. 3 and 4 or in FIGS. 32 and 33 may be effected by interleaving the strips by methods based on the shuffling together of two packs of cards or the methods employed in machines for counting or interleaving sheets of paper. It may here be mentioned that if the strips are bevelled over an appropriate length the overlapped joints when they have been interleaved will be of substantially the same thickness as the strip itself.

The interleaving may be effected by the use in conjunction of pressing members which press and bend the ends of the strips towards one another from either side an escapement device which allows the strips to interleave from opposite sides alternately.

Figure 34:
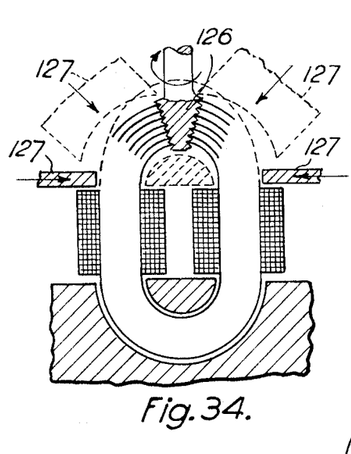
FIG. 34 illustrates a method of interleaving the ends of the core strips for a transformer in which the core is closed after threading the strips through the coils.

A simple device is a screw 126 FIG. 34 of appropriate pitch disposed in the gap between the ends of the strips. The bending devices 127 bend the ends of the strips sufficiently to mesh their bevelled edges with the thread of the screw which is suitably tapered towards its outer end. The screw is rotated in a direction to withdraw it when the strips will be automatically interleaved.

Figure 35:
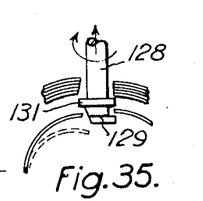
FIGS. 35 and 36 illustrate a detail modification of FIG. 34.
Figure 36:
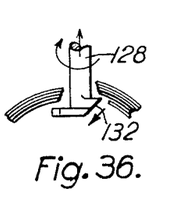

Instead of a simple screw a rod 128 (FIGS. 35 and 36) with a cam formation 129 with a similar action to a screw thread may act upon the strip ends in succession as it is rotated and withdrawn. The cam may include a shoulder 131 which supports all the strip ends except those being acted upon, this shoulder having a bevel 132 which allows the ends of the strips to escape in turn into position.

Figure 37:
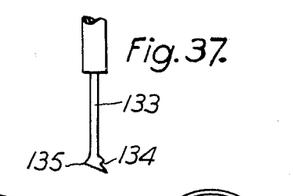
FIG. 37 illustrates a further detail modification of FIG. 34.

Instead of a rotating member there may be a simple pull member 133 FIG. 37 having bevelled projections 134, 135 on either side at such a spacing that as it is withdrawn it acts after the fashion of an escapement and allows the strips to move inwards from either side alternately under the pressure of the jaws.

If desired bevelling of the strip ends may be carried out so that at the central zone of their widths they are bevelled at a more acute angle and project at this zone of the width so that there is just a narrow portion which engages the screw, cam or escapement member.

Figure 38:
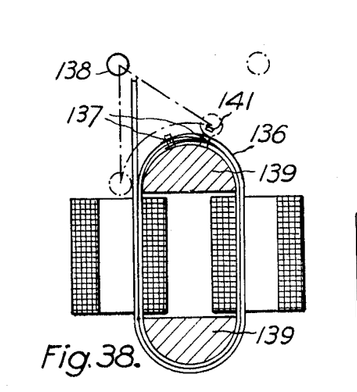
FIG. 38 is a side view and FIG. 39 a plan illustrating another method of closing a strip core after threading the strips through the coils.
Figure 39:
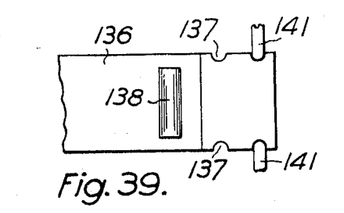

In another method illustrated in FIGS. 38 and 39 in which there is only a single joint, once again the strips 136 are produced in U-form with limbs of the requisite length. Their ends are bevelled or shaped with a re-entrant projection and recess to provide for overlapping joints and there is also a notch 137 on each side in the bevelled zone close to the end. Each U-form strip is however separately assembled starting from the inside. After the passage of the limbs of the first strip through the preformed windings, a roller 138 approaches in a path which carries it along the back of one projecting end portion of the strip until it reaches approximately the bottom of a filler-piece 139. The roller then moves in a path following the rounded form of the filler-piece, and thus bends the end of the strip over the filler-piece. Two fingers 141 then engage the leading end of the strip on either side and hold it down against its tendency to spring back. These fingers only over-lap a short part of the width of the strip and the length of the roller 138 is such that it can pass between the ends of the fingers. The roller then returns to its starting position leaving the strip held down by the fingers. Another roller on the other side then similarly bends over the second limb of the strip, the extreme end of which is held down by a second pair of fingers while the first pair of fingers rises, the notches in the second bent limb of the strip allowing the fingers to pass. The second U strip is then put into position and similarly bent, the fingers rising each time a bend is made through the notches on the strip which has last been bent over until the whole core has been assembled. The paths of the respective rollers will change slightly at each successive operation but this can be taken care of by spring mountings or the like. Also the pairs of fingers operating on each side alternately may be linked together or formed on the ends of a lever so that the movement of one pair to hold a strip just bent over may produce the necessary lifting of the other pair through the notches. It will be understood that the lever will have limbs of equal length and be pivoted on an axis lying in a median plane between the two limbs of the core. This axis will be lifted as the thickness of the assembled joints increases. Operation of this methed may also be facilitated by imposing vibrations laterally in the region of the parts of the strips to be bent over.

It is possible to apply this method with all the U-form strips first assembled, when if sufficiently intense vibration is employed at each stage the innermost strip will be sufficiently deflected from the still unbent strips to admit the roller which is of small diameter.

Figure 40:
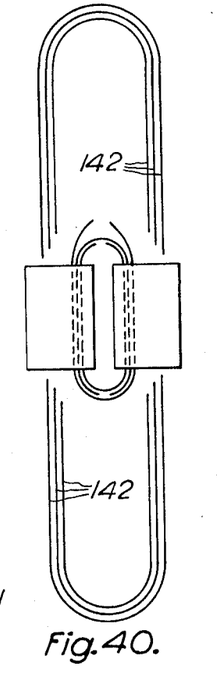
FIG. 40 illustrates a further method of closing a strip core after threading through, FIG. 41 illustrates yet another method of closing a strip core after threading through, FIG. 42 is an end view with certain parts in section and FIG. 43 a plan view with certain parts removed of another construction of transformer according to the invention.

In yet another form, the strips 142 FIG. 40 are again produced in U-form with limbs of the requisite length. Each U-form strip is separately assembled starting from the inside. After passage of the limbs of the first strip through the preformed windings, say upwardly, the projecting end portions are bent over towards one another, suitably over a filler-piece, by bending jaws or rollers which then retract. The second strip is inserted from the opposite end, in this example downwardly. The bent over arms of the first strip will be out of the path of the limbs of the second strip, so avoiding any scratching of any insulation or oxide layer. Finally the yoke of the second strip engages the bent ends of the first strip, completes bending of them and holds them so bent. The downwardly projecting ends of the second strip are then bent over, and the third strip is now inserted upwardly and so on. In each case the bending of the yoke in which a joint is formed is completed and the joint held together by the continuous yoke of the next strip as shown for the innermost strips in FIG. 40 (except the very last joint for which other provisions must be made). Butt joints are simplest to make by this method, but if the bending is arranged to bend one limb more than or before the other overlapped joints either bevelled or with a re-entrant projection fitting a recess can be made. The alternate strips are inserted from opposite ends and for convenience the two sets of strips may be held in respective magazines and associated mechanism may take them and insert them in the proper order. The amount of bending by the jaws or rollers may be to any convenient extent up to complete bending less the inevitable slight springing back when the jaws or rollers retract.

All the methods so far described in detail result in a core with only a single joint in each layer. If two joints in each layer are acceptable, further simplification can be achieved, illustrated in FIG. 41.

Figure 41:
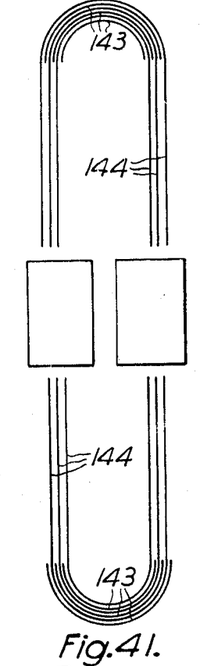

In this case pairs of complementary units inserted from opposite ends are used, each unit of a pair comprising the fully bent yokes 143 at the same end of two adjacent strips and portions (from 0 to 100 percent) of the limbs 144 of these strips. The units are inserted starting with the innermost pair. When they have been inserted, since they are complementary, the two innermost (first and second) loops of the core will be complete and no bending will be needed after insertion. There will be relative movement between the limbs of the two units but scratching can be avoided by a suitable lubricant or coating. To facilitate handling the two parts of each unit may be secured together over a suitable portion of their length by adhesive; also the sets of units for insertion from opposite ends may be stored in respective magazines and associated mechanism may effect insertion in the correct order.

The length of limb in each unit may vary so as to distribute the joints as described when the assembly is complete. For example if as illustrated each unit consists of only the yoke 143 of one strip and the yoke 143 and whole length of the limbs 144 of the other, the joints will lie alternately at the junction at opposite ends between the limbs with the yokes. Again by providing every strip with half the length of the limbs all the joints will come half way within the windings. Other dispositions such as stepped arrangements, or arrangement on inclined lines are also possible.

The joints in this form again may be butt joints on right angle or inclined or interfitting V-ends. Or they may overlap on bevelled ends of the strips.

In all the above described methods, the individual strips may be cut to length from a continuous strip, and have their ends shaped, and be bent to U-form by the aid of press tools, thereafter being annealed. For the last described method in which all bending is done before the strips are inserted, a length sufficient for one complete core may be wound round a mandrel of suitable section the coil then cut through at two places to produce the necessary separate pieces, and the material finally annealed. If the cuts are at a slope joints overlapping in thickness and longitudinally spaced dispositions will be produced. The cuts may also be inclined transversely of the strips. It is moreover possible to turn some of the cut strips over before assembling the units so producing staggered disposition of the joints.

Figure 42:
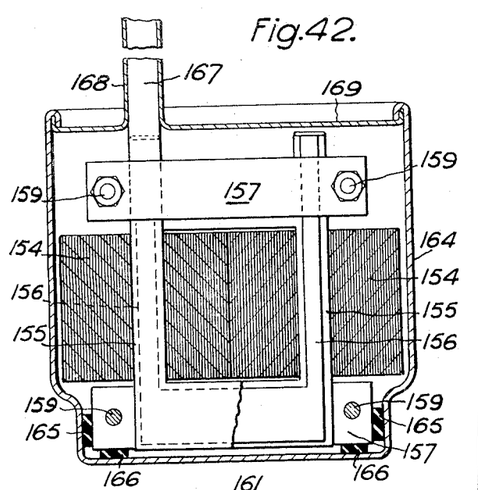
Figure 43:
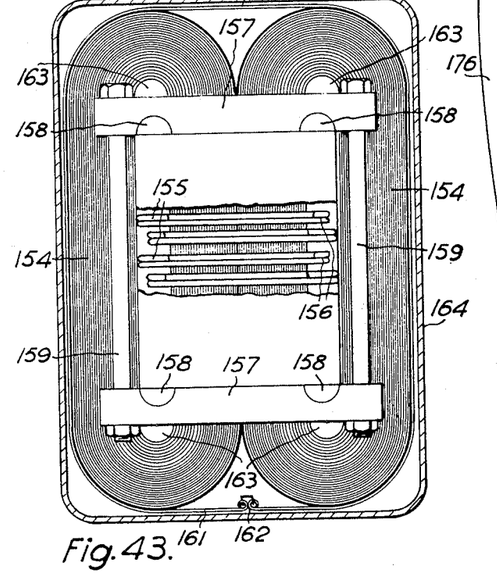

The transformer shown in FIGS. 42 and 43 has the coils made up of pieces and accordingly a core 154 which is closed before the winding is applied or actually made in closed form for instance from a continuous steel strip or by the use of stampings of suitable shape, can be employed. The coils are made up of pieces such as those of the form described above with reference to FIG. 22. Furthermore the corresponding parts of alternate turns are narrower and wider in the manner above described with reference to FIG. 19. Thus the wider turns are marked 155 and the narrower 156. It will also be seen that in addition to this staggering measure the part of each turn within the core window is narrower than the part outside.

Axial compression of the coils is applied by two stout cross bars 157 at each end and narrow cross bars 158 disposed at right angles to the bars 157 and let into grooves in the latter. To facilitate alignment the bars 158 may be of semicircular cross section. The bars 157 are drawn together in pairs by means such as bolts 159. The two parts of the core are encircled by a strap 161 the ends of which are held together by a clamping device 162 which enables the strap to be drawn taut. The windings are located by the aid of wedges 163 between the bars 157 and the core and the whole assembly is enclosed in a canister 164, resilient wedges 165 and feet 166 holding the transformer steady within the canister. Alternatively the bars 157 may be wedged against the core, the bars then not only locate the coils relative to the core but also stress the core axially at the same time.

The ends of the windings make clamped joints with terminal strips 167 which pass out through a tubular extension 168 in the cover 169 of the canister. The canister is filled with a suitable di-electric liquid and the strips 167 may if desired or necessary be sealed in the tube 168; if there is a seal the flat sides of the canister provide for expansion and contraction of the liquid. The tubular extension 168 acts as condensing walls effecting reflux of any vapour rising from the liquid. It will be understood that the primary and secondary windings are sectionalised with the sections alternately arranged. They can be inter-connected by clamped joints on the lines of those above described with reference to FIGS. 32 and 33.

Transformer design in general calls for a high space factor of core cross-section within the coils and the transformer as above described with reference to FIGS. 42 and 43 which has rectangular coils and rectangular core cross-section enables such space factors to be achieved. This could interfere with adequate flow of the di-electric liquid between the core and coils in the case of such a transformer immersed in a canister. With a core cross-section of up to .4 square inches, the space factor which can be conveniently reached will always leave an adequate channel width for flow of the liquid. For larger cross-sections the channel cross-section can be calculated and the square root of the cross-section of the core (in square inches) should be larger than 16 times the minimum channel width required for the cooling liquid.

In FIGS. 42 and 43, the canister closely surrounds the transformer itself and with medium or larger sized low efficiency transformers its surface unless it is specially extended will be insufficient to dissipate the heat developed without rising to an undesirbaly high temperature. To deal with this the canister may be held in a heat dissipating body of larger surface which makes good contact with it and is itself of material of good heat conductivity.

Figure 44:
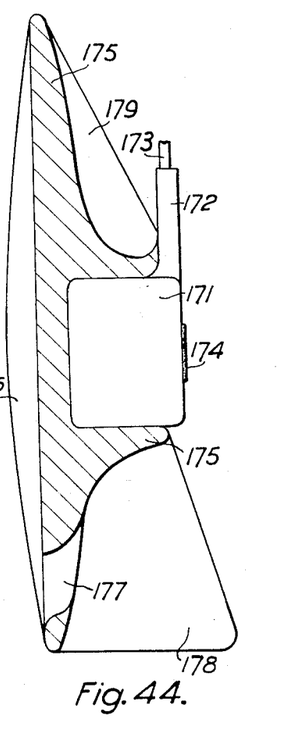
FIG. 44 is a section illustrating a heat dissipating body used in conjunction with a transformer according to the invention.

As indicated in FIG. 44 the canister 171 with its tubular extension 172 through which the terminal strips 173 extend, is held by a strap 174 in a recess in the heat dissipating body 175. The canister makes good heat conductive contact with the walls of the recess so that the heat is conducted to the body 175 with a very small temperature gradient and the latter is shaped to provide a large external dissipating surface. In this particular example it is assumed that the principal dissipation is to the left and the body expands in this direction and is also provided with dissipating ribs 176 on the left hand surface. An opening 177 admits air which circulates over the back of the assembly. There are also ribs 178 constituting feet and further ribs 179.

Before describing in greater detail how the heat dissipating body may be made it should be mentioned that any surface likely to be contacted by human beings of such a dissipating body or any other heat dissipating enclosure of the transformer is desirably provided with a thin layer of "heat delaying" character that is to say of comparatively low thermal conductivity. Its thickness should not exceed say 1 mm. and it is desirably of a decorative character; it may be of glass fibre cloth or a thick paper. Then even though the surface temperature may be one which could cause harm, momentary contact will not cause anything more than discomfort because the transmission of heat through the layer will be sufficiently slowed down as compared with the contact with the bare material of good heat conductivity. Actually the thinness of this surface layer will allow only its own small heat capacity to be momentarily discharged to the contact while its thermal barrier character delays the heat flow from behind. Thus the recharging of this heat capacity proceeds slowly enough to avoid additional discomfort after the first slight "shock" but naturally contact with the hot surface for any length of time would harmful.

The heat dissipating body 175 acts as a heat sink for the transformer and it offers an ample cross sectional area for heat flow from the relatively small surface of the canister 171 to the much larger heat dissipating surface constituted mainly by the ribs 176 and 179. If the body 175 were made of solid metal e.g. a casting such as an aluminium die casting, a pressing, or a structure fabricated by conventional methods, its cost if only on account of the weight of metal needed, would be high.

The present invention proposes that the heat dissipating body 175 should be made of metal scrap, and/or swarf and preferably a binder as well. Carbon, coal dust or other low-cost waste material may also be incorporated.

The scrap material may be densely pressed and the binder which may be added before or after pressing, may be Portland cement with a filler, calcareous plaster, or other similar low-cost binder added in the form of a slurry. Alternatively it may be an adhesive or a mixture which can be cured or fired at relatively low temperature.

A small quantity of neoprene or other synthetic rubber latex can be added to the slurry to render it more smooth. Another desirable addition is a hardener to speed up the setting which can also be accelerated by heat, e.g. by arranging a heating film in or on the pressing and using it as described in my United States application Serial No. 783,609, filed December 29, 1958.

The preferred binder materials are those used in the building industry, as they are generally the cheapest and are capable of standing the temperature to which the body will be exposed. Vitreous enamels, glazing compounds, cements, synthetic resins, "low" melting metals or alloys and a variety of substances in the higher melting range of hot melt coating compounds are also suitable, but generally more expensive than the first mentioned groups of binders of the building industry.

It is preferred to use swarf, wire and other scrap metal consisting of relatively fine, thin and long pieces which do not require further cutting up and felt tightly together when compressed into a mould of the shape of the body. Scrap metal which comprises bulky pieces must be cut up first into chips before it can be compressed. Of the metals those of high thermal conductivity, i.e. copper and aluminium, and of soft temper and high ductility are preferred. Conventional scrap shears, baling presses and such like machines may be used to deal with the scrap metal, but the dies or moulds for any desired shape of envelope or panel, are, of course, special purpose tools.

Any gap between the canister 171 and the recess 175 in the body is readily filled with a potting resin or gap filling cement, and the shape of the recess 175 does not need to follow the intricacies of the coil surface the whole of which is cooled by the filling of the canister which in turn transmits the heat through the walls of the canister 171 to the body 175. In the body the heat spreads towards the surface of the body, the cross-section of the body 175 being so designed that this spread tends to reach all parts of the surface over paths of about equal and maximum thermal conductance, so that the whole surface is at about the same "low" temperature.

Instead of densely pressing the scrap material, the metal swarf or scrap metal comminuted for instance by cutting it, into particles small enough for the purpose, may be mixed into a cement slurry or into some other liquid binder and be cast or moulded to the required shape. In this case the pressing and the associated tool costs are avoided, but the binder has to provide more of the structural strength of the heat dissipating body.

Another possibility is to use graded foil, swarf and wire scrap which can still be compressed into the mould by hand or by light pressure. This filling is then impregnated by pouring the binder into the mould. For small quantity production it is a very economic method.

What I claim is:

1. A combined electrical step down transformer and heat dissipator forming part of an electrical heating system comprising an electrical resistance heating element separate from the combined transformer and dissipator, but supplied from the secondary winding thereof and converting substantially the whole electrical output of the combined transformer and dissipator into heat, the coils of said combined transformer and dissipator being proportioned so that when under normal load they convert a substantial though minor fraction of the electrical input into heat and the combined transformer and dissipator having an internal wall and including material of good heat conductivity in good heat conductive contact with every individual turn of at least the secondary winding of the transformer and with said internal wall of the dissipator to provide a direct path of good conductivity for heat from the secondary winding to the internal wall, whereby the dissipator transmits the heat produced by the coils directly into the same space in which the separate heating element operates without the necessity of additional dissipation devices and without any point within the transformer rising to a dangerous temperature.

2. A combined electrical step down transformer and heat dissipator, forming part of an electrical space heating system and having its primary winding for connection to a main supply, and giving a secondary voltage on normal load of below 48 volts said transformer being proportioned so that under normal load when the primary winding is connected to the mains not less than 10 percent of the electrical energy supplied to the transformer is converted into heat in the coils of the transformer, said heat dissipator comprising a heat conductive structure entirely enclosing said transformer coils and in good heat conductive contact with a substantial surface area of every turn of at least the secondary winding thereof, a heat dissipating surface on said structure of sufficient area to dissipate into the space to be heated substantially all the heat developed in the transformer under normal load at a temperature sufficiently low as not to necessitate additional heat dissipating devices for supplying said heat to the heating system of which the transformer loss is one source of heat, without any point within the transformer reaching a temperature at which damage would be caused to either of the transformer and strucure, and a low voltage electrical resistance heating element separate from the transformer and located in the space to be heated, said element being connected across the secondary winding of the transformer, and being proportioned to convert substantially the whole electrical output of the transformer into heat.

3. A combined electrical transformer and heat dissipator as set forth in claim 1 wherein the heat conductive material between the turns of the transformer winding and inner surface of the dissipator includes a fluid medium in which the transformer coils are immersed and which is in contact with every turn of at least the secondary winding of the transformer.

4. A combined electrical transformer and heat dissipator as set forth in claim 1 which includes a radiating panel in good heat conductive contact with said heat conductive material.

5. A combined electrical transformer and heat dissipator as set forth in claim 3 also including a thin-walled canister closely enclosing the whole transformer and a di-electric fluid filling the canister, the elasticity of the canister walls permitting deformation by the expanding hot fluid.

6. A combined electrical transformer and heat dissipator as set forth in claim 1 wherein the said heat conductive material includes a compacted inorganic powder the particles of which have at least an insulating surface.

7. A combined electrical transformer and heat dissipator as set forth in claim 4 wherein the dissipator includes a moulded body of finely divided scrap material of high heat conductivity and a binder.

8. A combined electrical transformer and heat dissipator as set forth in claim 1 wherein said dissipator includes a structure of compressed scrap metal.

9. A combined electrical transformer and heat dissipator as set forth in claim 3 including a canister enclosing at least the primary winding of the transformer part of said fluid medium being, a di-electric liquid filling said canister, a second canister enclosing the whole transformer including said first mentioned canister, and the remainder of said fluid medium being a different liquid filling said second canister.

References Cited by the Examiner

UNITED STATES PATENTS

| | | | |
|---|---|---|---|
| 1,052,119 | 2/1913 | Anderson | 219—10.49 |
| 2,000,413 | 5/1935 | Myers | 219—10.47 |
| 2,518,683 | 8/1950 | Haines et al. | 219—10.49 |
| 2,601,212 | 6/1952 | Polydoroff | 336—233 |
| 2,734,096 | 2/1956 | Ennis | 336—100 |
| 2,820,720 | 1/1958 | Iversen | 336—233 |
| 2,870,858 | 1/1959 | Adams | 336—100 |
| 2,927,291 | 3/1960 | Ruehle | 336—149 |
| 3,041,563 | 6/1962 | Carlsen | 336—149 |
| 3,060,299 | 10/1962 | Morgan | 219—494 |
| 3,073,940 | 1/1963 | Brandl | 219—508 |
| 3,089,017 | 5/1963 | Eisler | 219—503 |
| 3,101,525 | 8/1963 | Anderson et al. | 29—155.57 |
| 3,105,287 | 10/1963 | Whearley et al. | 29—155.57 |

RICHARD M. WOOD, *Primary Examiner.*

ANTHONY BARTIS, *Examiner.*